US009204413B2

(12) United States Patent
Gouriou et al.

(10) Patent No.: US 9,204,413 B2
(45) Date of Patent: Dec. 1, 2015

(54) SUBSCRIBER IDENTITY SWITCH OF A COMMUNICATION TERMINAL

(75) Inventors: Erwan Gouriou, Le Mans (FR); Erwan Preteseille, Arnage (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 75 days.

(21) Appl. No.: 13/995,359

(22) PCT Filed: Feb. 17, 2012

(86) PCT No.: PCT/EP2012/000710
§ 371 (c)(1),
(2), (4) Date: Jul. 17, 2013

(87) PCT Pub. No.: WO2012/110252
PCT Pub. Date: Aug. 23, 2012

(65) Prior Publication Data
US 2013/0310035 A1    Nov. 21, 2013

Related U.S. Application Data

(60) Provisional application No. 61/472,067, filed on Apr. 5, 2011.

(30) Foreign Application Priority Data

Feb. 19, 2011    (EP) ..................... 11290099

(51) Int. Cl.
*H04W 60/00* (2009.01)
*H04W 8/18* (2009.01)
(Continued)

(52) U.S. Cl.
CPC ............ *H04W 60/005* (2013.01); *H04W 8/183* (2013.01); *H04W 8/22* (2013.01);
(Continued)

(58) Field of Classification Search
None
See application file for complete search history.

(56) References Cited

U.S. PATENT DOCUMENTS

2004/0264414 A1    12/2004    Dorenbosch
2007/0298801 A1    12/2007    Kim et al.
(Continued)

FOREIGN PATENT DOCUMENTS

CN    101242600 A    8/2008
CN    101287217 A    10/2008
(Continued)

OTHER PUBLICATIONS

International Search Report on corresponding International Application No. PCT/EP2012/000710 mailed Aug. 29, 2013.
(Continued)

*Primary Examiner* — King Poon
*Assistant Examiner* — Vincent Peren
(74) *Attorney, Agent, or Firm* — Patent Portfolio Builders PLLC (57) ABSTRACT

A method of switching subscriber identity between a first and second telecommunication stack of a multiple subscriber identity communication terminal is disclosed. The method comprises initiating a switch for a first subscriber identity from the first telecommunication stack to the second telecommunication stack and for a second subscriber identity from the second telecommunication stack to the first telecommunication stack. It is determined whether a value of at least one network related parameter associated with the first subscriber identity in the first telecommunication stack corresponds to a value of a corresponding at least one network related parameter associated with the first subscriber identity in the second telecommunication stack. Network registration of the first subscriber identity is performed only if the value of the at least one network related parameter associated with the first subscriber identity in the first telecommunication stack does not correspond to the value of a corresponding at least one network related parameter associated with the first subscriber identity in the second telecommunication stack. Corresponding computer program product, controller, arrangement, and multiple subscriber identity communication terminal are also disclosed.

17 Claims, 2 Drawing Sheets

(51) Int. Cl.
H04W 8/22 (2009.01)
H04W 88/06 (2009.01)
H04W 76/02 (2009.01)

(52) U.S. Cl.
CPC ............ H04W 76/02 (2013.01); H04W 76/021 (2013.01); H04W 76/025 (2013.01); H04W 76/026 (2013.01); H04W 76/028 (2013.01); H04W 88/06 (2013.01)

(56) References Cited

U.S. PATENT DOCUMENTS

| | | |
|---|---|---|
| 2008/0280608 A1 | 11/2008 | Yu et al. |
| 2010/0311467 A1 | 12/2010 | Wu |
| 2011/0275371 A1* | 11/2011 | Roger ................... 455/435.1 |
| 2012/0135715 A1* | 5/2012 | Kang et al. ............ 455/412.1 |

FOREIGN PATENT DOCUMENTS

| | | | |
|---|---|---|---|
| EP | 1 223 768 | A1 | 7/2002 |
| EP | 2 046 085 | A1 | 4/2009 |
| EP | 2 214 444 | A1 | 8/2010 |
| GB | 2454970 | * | 5/2009 |
| TW | 535384 | B | 6/2003 |
| WO | 2010/140781 | A2 | 12/2010 |
| WO | 2010140781 | A2 | 12/2010 |

OTHER PUBLICATIONS

3GPP TS 24.008, V10.0.0, 3rd Generation Partnership Project; Technical Specification Group Core Network and Terminals; Mobile radio interface Layer 3 specification; Core network protocols; Stage 3 (Release) 10, 3GPP, Sep. 1, 2010, pp. 1; 84-91, XP002630726, retrieved from internet: URL:http://www.3gpp.org/ftp/Specs/archive/24_series/24.008/24008-a00.zip.

International Search Report issued in related International application No. PCT/EP2011/006217, date of mailing Feb. 14, 2012.

Ahmed, Zaheer et al., "A Navigation Device with MAC Supporting Multiple Physical Networks for Extended Coverage and Operations," IEEE Transactions on Consumer Electronics, IEEE Service Center, New York, NY, USA, vol. 54, No. 3, Aug. 1, 2008, pp. 1103-1109, XP011235554, ISSN: 0098-3063, DOI:10.1109/TCE.2008.4637594.

International Search Report issued in corresponding International application No. PCT/EP2012/000710, date of mailing Apr. 18, 2012.

International Preliminary Report on Patentability mailed Aug. 29, 2013 in related International Application No. PCT/EP2012/000710.

* cited by examiner

SUBSCRIBER IDENTITY SWITCH OF A COMMUNICATION TERMINAL

TECHNICAL FIELD

The present invention relates generally to the field of communication terminals and methods for use in such terminals. More particularly, it relates to switching of subscriber identity between telecommunication stacks of a communication terminal.

BACKGROUND

In typical cellular applications, an active subscriber identity needs to be registered in a corresponding network to be able to perform communication via the network. Such communication may, for example, comprise initiating and receiving calls, SMS (short message service) and the like. Thus, an aim of performing a registering procedure (e.g. signaling procedure towards the network (attach procedure, location update, muting area update, etc.) towards a network is to inform the network that the mobile terminal associated with the subscriber identity is switched on and is able to receive paging and other messages from the network.

When a subscriber identity performs a de-registration from a network, a purpose is to inform the network that the mobile terminal associated with the subscriber identity is switched off and, hence, that paging and other messages should not be transmitted/broadcasted anymore.

A registered subscriber identity may also perform update procedures towards the network at defined moments in time.

This may for example be the case when the location of the mobile terminal has changed.

Another example is that a typical network may require a registered subscriber identity to perform a periodic update procedure towards the network to confirm its active status (and possibly its location).

Typically, the network maintains a timer for this purpose. The timer is reset whenever a subscriber identity performs a registration or update procedure. If the tinier expires, the network typically considers the subscriber identity as de-registered. This has the advantage that the network will not waste efforts in trying to reach a subscriber identity that has become un-reachable without having performed the de-registration procedure (e.g. due to loss of coverage, low battery, battery removal, etc.). A typical timer setting may be that it expires after approximately 6 hours or more than 6 hours. The example timer T3212 in 3GPP specification TS24.008 has an expiry setting of 6 hours.

A corresponding timer (typically shorter than the network timer) is maintained in the mobile terminal for the subscriber identity. This timer is also reset whenever a subscriber identity performs a registration or update procedure. When the timer expires, a periodic update procedure for the subscriber identity should typically be initiated by the mobile terminal. Examples of such timers are the timers T3212 and T3312 in 3GPP specification TS24.008. The timer duration value(s) may typically be either strictly defined in an applicable standard or broadcast by the network (e.g. in a System Information signaling). The timer maintained in the mobile terminal for the subscriber identity typically has a timer duration value that is directly related to the timer duration value of the corresponding timer maintained in the network.

Typically, the periodic update timer of a subscriber identity is running in the terminal only for a subscriber identity which is currently active (e.g. served by a stack). The timer may be kept running even during e.g. loss of coverage. Thereby, a subscriber identity gaining coverage again may be able to determine if the network has de-registered it or not.

Related to a subscriber identity, a corresponding context is maintained in the network for that particular subscriber identity. The context may, among other things, maintain information regarding the status of the subscriber identity (e.g. registered or de-registered) and location information of the subscriber identity (e.g. home location and temporary location, such as local temporary identity—TMSI (temporary mobile subscriber identity)/P-TMSI (packet temporary mobile subscriber identity)). Some information of the context may be always maintained (e.g. status and home location), while other information may only be maintained while the subscriber identity is registered (e.g. temporary location).

The context is updated when a subscriber identity is registered, updated and/or de-registered in the network. The context may also be updated at other times.

Due to this context, the network is able to know if a particular subscriber identity is able to receive messages (e.g. paging) or not, and at which location the network should transmit the messages.

A DSDS (dual SIM dual standby) phone is equipped with two subscriber identity means (e.g. two SIM sockets and two copies any hardware directly associated with the SIM sockets). It is adapted to be able to receive paging messages and perform necessary measurements for both subscriber identities if they are both in idle mode. However, as soon as one of the subscriber identities enters a connected mode, the DSDS phone is typically not able to attend to the other subscriber identity. For example, a DSDS phone may have dual SIM software stacks and associated hardware architecture, but only one baseband processing unit and radio frequency unit.

When one subscriber identity is performing communication, the other subscriber identity is typically not reachable from the network point of view. Thus, no communication can be performed for the other subscriber identity.

A DSDC (dual SIM dual connected) phone is also equipped with two subscriber identity means (e.g. two SIM sockets and two copies any hardware directly associated with the SIM sockets). It is also adapted to be able to receive paging messages and perform necessary measurements for both subscriber identities when they are in idle mode. However, when one of the subscriber identities enters a connected mode, the DSDC phone is still able to attend to the other subscriber identity (e.g. performing measurements and listen to pages). For example, a DSDC phone may have dual SIM software stacks and associated hardware architecture, and also dual baseband processing units and radio frequency units.

From a user perspective, a dual SIM phone provides the possibility to use two different subscriber identities in one single device without having to perform a physical subscriber identity module exchange.

The behavior towards the network of dual SIM phones (e.g. DSDS or DSDC) is not specified in any standard. Typically, single subscriber identity device behavior is adopted by default.

For a single subscriber identity device (e.g. a single SIM phone), the registration procedure is typically performed at power on and the de-registration at power off.

For a dual or multiple subscriber identity device in which the multiple subscriber identities may be simultaneously active at least in idle mode (e.g. a DSDS phone or a DSDC phone), registration/de-registration/update procedures may typically also be performed at other times than power on/off.

The registration, update and de-registration processes takes some time. In an example scenario, the de-registration/registration processes typically take approximately 8 seconds.

If several registration/update/de-registration procedures are performed in sequence, there is a risk of signaling overload towards the network. Naturally, a situation of signaling overload should preferably be avoided.

Naturally, the operations performed and the signaling involved in association with registration/update/de-registration also consumes power.

These problems are experienced in both single and multiple subscriber identity devices. Some problems are typically more pronounced in multiple subscriber identity devices (since, there is typically more registration/de-registration/update procedures performed in such devices), for example the delay problem.

Therefore, there is a need for improved methods and arrangements for multiple subscriber identity scenarios of a communication terminal.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods and arrangements of switching subscriber identity between telecommunication stacks of a communication terminal.

According to a first aspect of the invention, this is achieved by a method of switching subscriber identity between a first and second telecommunication stack of a communication terminal, wherein the communication terminal is a multiple subscriber identity terminal.

The method comprises initiating a switch for a first subscriber identity from the first telecommunication stack to the second telecommunication stack and for a second subscriber identity from the second telecommunication stack to the first telecommunication stack, determining whether a value of at least one network related parameter associated with the first subscriber identity in the first telecommunication stack corresponds to a value of a corresponding at least one network related parameter associated with the first subscriber identity in the second telecommunication stack, and performing network registration of the first subscriber identity only if the value of the at least one network related parameter associated with the first subscriber identity in the first telecommunication stack does not correspond to the value of the corresponding at least one network related parameter associated with the first subscriber identity in the second telecommunication stack.

The determination of whether a value of at least one network related parameter associated with the first subscriber identity in the first telecommunication stack corresponds to a value of a corresponding at least one network related parameter associated with the first subscriber identity in the second telecommunication stack may, in some embodiments, comprise comparing the value of the at least one network related parameter associated with the first subscriber identity before the stack switch to the value of the corresponding at least one network related parameter associated with the first subscriber identity after the stack switch.

The determination of whether a value of at least one network related parameter associated with the first subscriber identity in the first telecommunication stack corresponds to a value of a corresponding at least one network related parameter associated with the first subscriber identity in the second telecommunication stack may, in some embodiments, comprise comparing the value of the at least one network related parameter associated with the first subscriber identity before the stack switch to the value of the corresponding at least one network related parameter associated with the second subscriber identity before the stack switch.

In some embodiments, the step of performing network registration of the first subscriber identity only if the values do not correspond to each other may comprise performing only a partial registration of the first subscriber identity, e.g. an update procedure.

The at least one network related parameter may include one or more of an update status in the network, a registered/de-registered status in the network, a network code, a network identity, an operator identity, location information, a location area parameter, a routing area parameter, a network code, a location area code, a routing area code, an identity field, and a radio access technology indication.

The method may, according to some embodiments further comprise determining whether a value of at least one non-network related parameter associated with the first subscriber identity in the first telecommunication stack corresponds to a value of a corresponding at least one non-network related parameter associated with the first subscriber identity in the second telecommunication stack, and performing network registration of the first subscriber identity only if the value of the at least one non-network related parameter associated with the first subscriber identity in the first telecommunication stack does not correspond to the value of the corresponding at least one non-network related parameter associated with the first subscriber identity in the second telecommunication stack.

As above, there are various alternatives of performing the determination, and the registration may be a partial registration.

The at least one non-network related parameter may include one or more of a mobility parameter, serving cell information, cell identity, neighboring cells information, a stack capability, and a stack IMEI—international mobile equipment identity.

In some embodiments, the method may further comprise temporarily storing the value of at the least one network related parameter and/or non-network related parameter associated with the first subscriber identity in the first telecommunication stack before the determination steps.

The method may further comprise resetting the second telecommunication stack to a state associated with the first subscriber identity without performing network de-registration of the first subscriber identity.

The step of initiating the switch for the first subscriber identity may comprise receiving a switch request for the first subscriber identity via a user interface of the communication terminal, detecting a match of current conditions with an entry of conditions in a user preference list, and determining a need for switch based on the match detection, and/or detecting a current quality of service for the first subscriber identity being below a threshold, wherein the threshold is based on a required quality of service of an application currently associated with the first subscriber identity.

An application currently associated with the first subscriber identity includes a requested application and/or an ongoing application.

A second aspect of the invention is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect of the invention is a controller for a communication terminal, wherein the communication terminal is a multiple subscriber identity terminal. The communication terminal comprises at least first and second telecommunication stacks adapted to support a respective subscriber identity.

The controller is adapted to initiate a switch for a first subscriber identity from the first telecommunication stack to the second telecommunication stack and for a second subscriber identity from the second telecommunication stack to the first telecommunication stack.

The controller is also adapted to determine whether a value of at least one network related parameter associated with the first subscriber identity in the first telecommunication stack corresponds to a value of a corresponding at least one network related parameter associated with the first subscriber identity in the second telecommunication stack, and to cause the communication terminal to perform network registration of the first subscriber identity only if the value of the at least one network related parameter associated with the first subscriber identity in the first telecommunication stack does not correspond to the value of the corresponding at least one network related parameter associated with the first subscriber identity in the second telecommunication stack.

In some embodiments, the controller may be further adapted to detect a current quality of service for the first subscriber identity being below a threshold, wherein the threshold is based on a required quality of service of an application currently associated with the first subscriber identity, and to initiate the switch if the current quality of service for the first subscriber identity is below the threshold.

The controller may be further adapted to detect a match of current conditions with an entry of conditions in a user preference list, and initiate the switch if there is a match of conditions.

A fourth aspect of the invention is an arrangement adapted to switch subscriber identity between a first and second telecommunication stack of a communication terminal. The arrangement comprises a memory adapted to temporarily store the value of the at least one non-network related parameter associated with the first subscriber identity in the first telecommunication stack, at least the first and second telecommunication stacks adapted to support a respective subscriber identity, and the controller according to the third aspect.

A fifth aspect of the invention is a multiple subscriber identity communication terminal comprising the arrangement according to the fourth aspect.

In some embodiments, the multiple subscriber identity communication terminal may further comprise a user interface for inputting a subscriber identity switch request.

In some embodiments, the third, fourth and fifth aspects of the invention may additionally have features identical with or corresponding to any of the various features as explained above for the first aspect of the invention.

An advantage of some embodiments of the invention is that the time required for a switch of subscriber identity between telecommunication stacks of a communication terminal is reduced.

The registration and de-registration processes takes some time. In an example scenario, the de-registration/registration processes of a subscriber identity switch typically takes approximately 8 seconds of the totally 15-30 seconds needed for the subscriber identity switch. Thus, in some embodiments, a time required for a switch of subscriber identity between telecommunication stacks in a multiple subscriber identity device may be reduced by approximately 30-50% (e.g. if the location information is utilized as will be described in the following). In some embodiments, if other parameters are also utilized (e.g. serving and neighboring cells context), even more time may be saved since, in these scenarios, there is no longer any need to do a new full cell search procedure to find the network for each stack. For some embodiments, it is possible to reduce the required time for a switch of subscriber identity between telecommunication stacks in a multiple subscriber identity device by up to 80%

Another advantage of some embodiments of the invention is that power consumption of a device performing a switch of subscriber identity is reduced.

Another advantage of some embodiments of the invention is that less signaling between terminal device and networks is required in association with a switch of subscriber identity between telecommunication stacks.

Yet another advantage of some embodiments of the invention is that the service as experienced by the user remains unaffected.

BRIEF DESCRIPTION OF THE DRAWINGS

Further objects, features and advantages of the invention will appear from the following detailed description of embodiments of the invention, with reference being made to the accompanying drawing, in which.

DETAILED DESCRIPTION

In the following, embodiments of the invention will be described where alternative procedures for switching subscriber identity between telecommunication stacks of a communication terminal are used.

For a dual or multiple subscriber identity device in which the multiple subscriber identities may be simultaneously active at least in idle mode (e.g. a DSDS phone or a DSDC phone), registration/de-registration/update procedures are typically performed no only at power on/off but are typically also performed at e.g. a switch of subscriber identity between telecommunication stacks.

In order to switch from one subscriber identity to another for a telecommunication stack of a dual SIM device (or any other suitable type of device for that matter), a complete re-initialization of the telecom stack to the other subscriber identity is typically needed. Also typically, various switch off/on procedures (including network procedures such as de-register/register and detach/attach for CS (circuit switched) and PS (packet switched) domains) will be performed for the respective subscriber identities to be de-activated and activated respectively.

Thus, when a switch of subscriber identity is initiated between stacks on a dual SIM phone, a de-registration/registration procedure is performed (twice—once for each subscriber identity).

A switch of subscriber identities between telecommunication stacks of a dual/multiple subscriber identity device may, for example, be relevant in the case where a first stack supports only a limited number of communication standards (e.g. a 2G communication standard such as GSM) while another stack supports a larger variety of communication standards (e.g. a 2/2.5G communication standard such as GSM/GPRS/EDGE and a 3G communication standard such as WCDMA and/or LTE). Various other combinations (e.g. of 2G—GSM voice, 2.5G—GSM/GPRS/EDGE, 3G—WCDMA, HSPA, LTE, etc) may be applicable. In a more general scenario, the first stack has more advanced (or at least different) capabilities than the second stack.

In a scenario such as the first one above it may be envisioned that a user having two 3G-enabled subscriber identities might sometimes use one subscriber identity in 3G communication and at other times use the other subscriber identity in 3G communication. Thereby, a stack switch is necessitated.

It may also be envisioned that a device may automatically switch the stacks for two 3G-enabled subscriber identities when a need for such switch is detected. For example, when the device detects that a high data rate service is ongoing or requested for one subscriber identity, it may ensure that that subscriber identity resides in the stack having best data rate abilities available. Thereby, a stack switch may be necessitated.

The initiation of a stack switch may be triggered by a user input via an interface of the device. Alternatively or additionally, initiation of a stack switch may be triggered automatically by the device (e.g. after detection of a need or quality problem for one of the subscriber identities as exemplified above). Yet alternatively or additionally, the device may hold a preference list (input and edited by a user of the device via an interface) defining conditions for stack switch initiation (e.g. what stacks should be used for which services).

In the following description of embodiments, a DSDS phone will be used as example for illustrative purposes.

For a typical DSDS phone, the respective SIM has status registered in its respective network (which may be the same or different networks). If any of the SIMs is enabled to communicate via several networks it typically has status registered in one of the networks and status de-registered in the other networks. When a SIM switch between stacks is performed in the typical DSDS phone the respective network experience a full de-registration and SIM de-activation procedure, and a full registration and SIM activation and registration procedure for the respective SIM. In an example situation, since there is a swap of stacks the context associated with each stack must typically be reset/rebuilt from scratch, which triggers the de-registration and registration.

As remarked above, these procedures have several disadvantages, including time delay, power consumption, and signaling overload.

On the other hand, not performing these procedures may have serious impact on quality of service, since nothing is done to ensure that an appropriate registration status and context is maintained in the respective network.

Embodiments of the invention utilizes at least one network parameter (e.g. location information) to determine when it is necessary to register/update a SIM after a switch of subscriber identities between stacks, and performs network registration/update of the respective SIM only when it is necessary.

Thus, de-registration, updating and registration is avoided to a large extent in embodiments of the invention. One advantage of this is that the time consumption of the SIM switch is reduced. That de-registration, updating and registration is not completely avoided ensures that the service accessibility is not impaired. The mobile terminal behavior may be adopted based on how the network monitors the subscriber identity status (registered/de-registered). For example, de-registration may be completely avoided and it is left to the network to de-register a SIM which has been inactive for a long time (e.g. similar to as if the SIM experienced out-of-coverage conditions). If certain parameters are taken into account, it may be possible for the mobile terminal to determine, when that SIM is switched to another stack, if network registration/updating is necessary not.

Hence, network registration/updating/de-registration signaling is optimized according to some embodiments of the invention.

In some embodiments, it is determined that no registration/updating/de-registration is necessary if one or more (predefined or dynamically set) parameters coincide for the subscriber identity before and after the stack switch.

In some embodiments, it is determined that no registration/updating/de-registration is necessary if one or more (predefined or dynamically set) parameters coincide for the two subscriber identities to be switched before the stack switch.

In some embodiments, it is determined that registration/updating is necessary if one or more (predefined or dynamically set) parameters differ for the subscriber identity before and after the stack switch.

In some embodiments, it is determined that registration/updating is necessary if one or more (predefined or dynamically set) parameters differ for the two subscriber identities to be switched before the stack switch.

For example, if one of the subscriber identities switches from a 3G-capable stack (but is currently camping on a 2G base station) to a 2G-capable stack and the operating networks for the subscriber identity before and after the switch are the same (e.g. same operator), there may not be any need to register/de-register.

On the other hand, if one of the subscriber identities switches from a 2G-capable stack to a 3G-capable stack and the operating networks for the subscriber identity before and after the switch are not the same (e.g. different operators), there may be a need to at least perform a registering procedure in the 3G network.

Other examples of when at least a registering/update may be needed are when one or more of the parameters that will be mentioned in the following differ before and after the switch. In some scenarios (e.g. if only some of the location information differs) it may suffice with an update procedure. In other scenarios (e.g. for a new network as above) a full registration procedure may be necessary.

The parameters may comprise parameters related to location and/or other information.

Following is a non-exhaustive list of possible parameter categories and parameters that may be used in various embodiments of the invention:

Status in relation to the network (update status, network code, location/routing area (network code (MCC—Mobile Country Code, MNC—Mobile Network Code), location area code (location area identity)), muting area code, identity fields (TMSI/P-TMSI, etc), radio access technology (2G, 3G, LTE, etc))

Serving cell information and neighboring cells information.

If serving and neighboring cell information is transferred between stacks of a stack switch the time to camp on a cell after the switch is typically reduced and the initial mobility information is improved after the switch since the terminal can utilize information already gathered in the old stack and does not have to perform all measurements on the new stack at once.

In some example embodiments, when camped on a cell after the stack switch, the terminal may compare parameter(s) extracted after the switch with the corresponding stored parameters (from before the switch) and determine whether or not to trigger registration/updating. The parameters used in such a determination may comprise one or more of:
- update status prior to switch,
- location/routing area before and after switch,
- radio access technology before and after switch,
- network identity (e.g. operator) before and after switch,
- the different capabilities of the stacks (update of UE—user equipment—capability to the network may be necessary).

Another parameter that may (additionally or alternatively) be taken into consideration is IMEI. Typically (e.g. in single subscriber identity devices), this parameter comprises the UE identity and is assigned to a UE as a whole (HW and stack). The IMEI parameter can, for example, be used in order to block a UE from accessing the network if the IMEI is presently on a black list (e.g. of stolen terminals).

The network may request the IMEI value from the UE (e.g. when UE registers with the network or at later stage when, for example, the UE is establishing a connection). The network may then associate the IMEI (International Mobile Equipment Identity) with the IMSI (International Mobile Subscriber Identity).

In some multiple subscriber identity devices, a respective IMEI is assigned to each stack. Hence, when a subscriber identity is switching stack, a registration to the network might be needed in order to update the network about the new IMEI/IMSI association.

Figure 1:
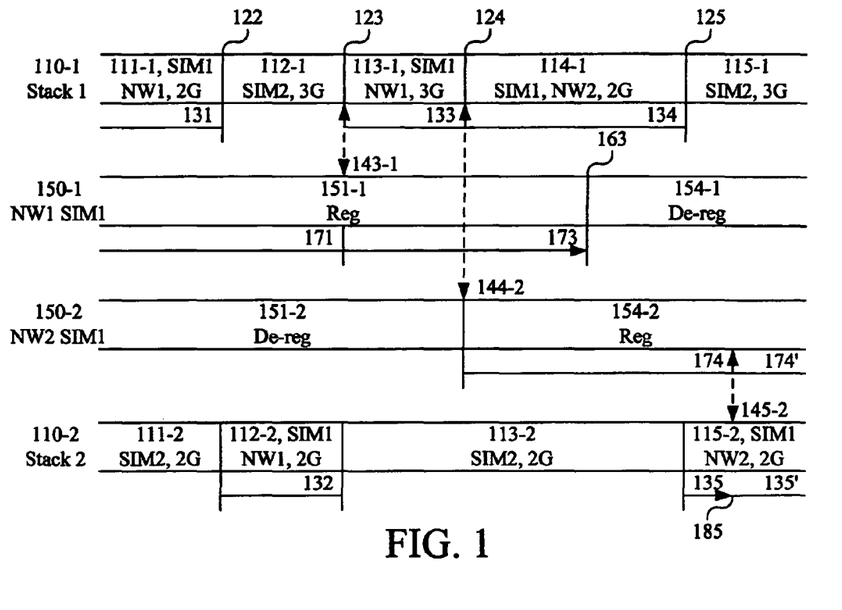
FIG. 1 is a schematic timing diagram illustrating subscriber identity procedures toward a first and a second network according to some embodiments of the invention.

FIG. 1 is a schematic timing diagram that illustrates status in a first terminal stack 110-1 and a second terminal stack 110-2 (e.g. of a DSDS or DSDC phone) of two SIMs (SIM1 and SIM2). FIG. 1 also illustrates SIM1 status in a first (NW1) and second (NW2) corresponding network 150-1, 150-2, and SIM1 related signaling 143-1, 144-1, 144-2, 145-2 between the phone (respective stacks) and the respective networks.

NW1 may be a 2G/3G network and NW2 may be a 2G or a 2G/3G network (for example from two different operators) in this example. The first stack may have both 2G and 3G capabilities while the second stack may have only 2G capabilities.

The network status and signaling for SIM2 is not show in the figure, but may function correspondingly (in relation to the illustrated or other networks). The example is equally applicable to circuit switched and packet switched services.

Initially SIM1 is active in the first stack (as illustrated by 111-1) and SIM2 is active in the second stack (as illustrated by 111-2). SIM1 is registered in the network context of the first network (as illustrated by 151-1) and de-registered in the network context of the second network (as illustrated by 151-2). A network timer is running for monitoring the registered status (as illustrated by 171) and a corresponding periodic update timer is running in the first stack (as illustrated by 131).

The periodic update timer is typically kept in association with the serving stack, and its value may be transferred between stacks at a subscriber identity switch as will be seen in the following.

At time instant 122, a first SIM switch takes place in the terminal between the first stack 110-1 and the second stack 110-2. The SIM switch may be either user initiated or autonomously performed by the terminal (e.g. due to that SIM2 would currently benefit from 3G capabilities). According to embodiments of the invention, one or more parameters relating to the periodic update tinier 131 is transferred from the first to the second stack and the second stack 110-2 is re-initiated for SIM1 (and vice versa for SIM2).

Thus, after time instant 122, SIM1 is active in the second stack (as illustrated by 112-2) and SIM2 is active in the first stack (as illustrated by 112-1). SIM1 is still registered in the network context of the first network (as illustrated by 151-1). The value of the periodic update timer 131 has been transferred from the first to the second stack and a corresponding periodic update timer is now running in the second stack (as illustrated by 132). The timer 131 associated with SIM1 in the first stack is no longer running.

It is to be noted, no de-registration (by the first stack) and registration/update (by the second stack) of SIM1 is performed at time instant 122 according to this embodiment. This may be due to that the terminal is set to never de-register at stack switches and that the terminal has concluded that no registering/update is needed (all relevant parameters match as has been described above and will be further elaborated on in relation to FIG. 2).

As described above, it may be determined, based on various parameters relating to the network identity and the current location information of the terminal, whether or not there is a probable need to perform de-registering and/or registering and/or updating of the respective SIMs in association with the switch of subscriber identities between the telecommunication stacks.

At time instant 123, a second SIM switch takes place in the terminal between the first stack 110-1 and the second stack 110-2. As before, the SIM switch may be either user initiated or autonomously performed by the terminal (e.g. due to that SIM1 would currently benefit from 3G capabilities).

After this switch, SIM1 is active in the first stack (as illustrated by 113-1) and SIM2 is active in the second stack (as illustrated by 113-2). SIM1 is registered in the network context of the first network after the switch (as illustrated by 151-1). Since, for example, some parameters differs before and after the stack switch, registration (or updating, depending on the differing parameters and terminal settings) to the first network (by the first stack) of SIM1 is performed at time instant 123 according to this embodiment (as illustrated by signaling 143-1). A de-registration from the first network (by the second stack) of SIM1 may or may not performed at time instant 123. FIG. 1 illustrates the alternative where no de-registration is performed.

The network timer for monitoring the registered status in the first network is reset (as illustrated by 173) and a corresponding periodic update timer is initiated in the first stack (as illustrated by 133). The timer 132 associated with SIM1 in the second stack is no longer running.

At time instant 124, SIM1 and SIM2 remain in their current stacks, but SIM1 is switching from 3G on the first network to 2G on the second network (e.g. due to bad coverage of the first network (network topology), or due to user preferences). Thus, SIM1 is still active in the first stack (as illustrated by 114-1) and SIM2 is still active in the second stack (as illustrated by 113-2). A registration of SIM1 towards the second network is performed by the first stack (as illustrated by signaling 144-2).

After time instant 124, SIM1 is registered in the network context of the second network (as illustrated by 154-2).

A network timer is initiated for monitoring the registered status in the second network (as illustrated by 174) and a corresponding periodic update timer is initiated in the first stack (as illustrated by 134), replacing the timer 133 associated with the first network for SIM1 in the first stack.

In another scenario, a network change for SIM1 may be simultaneous (or even triggered by) a stack switch for SIM1 from e.g. the first to the second stack (due to stack capabilities, subscriber particulars, and/or network topology). In such a scenario, the signaling 144-2 would originate from the second stack and a possible de-registration would be by the first stack. The timer 134 would run in the second stack.

A de-registration from the first network (by the first stack) of SIM1 may or may not performed at time instant 124 (just before the stack switch). FIG. 1 illustrates the alternative where no de-registration is performed. Thus, since (according this example) no de-registration of SIM1 is made at time instant 124, SIM1 is still registered in the network context of the first network (as illustrated by 151-1).

In 3GPP and 3GPP2, for example, there is strictly no need to de-register from one network when registering on new network. This is in fact managed autonomously by the network in some scenarios. The HOME network is controlling the information of its associated mobiles. Therefore, the HOME network receives the update information (through the new network) and triggers corresponding updates (e.g. de-registration for the prior network if needed (including stopping of timer 173), the storing of the new location of the mobile, etc.).

However, in the scenario illustrated in FIG. 1, the network timer 173 for SIM1 in the first network has continued to run since no de-registration was performed at time 124. At time instant 163, this timer expires. Hence, the first network autonomously changes the network status for SIM1 to de-registered (as illustrated by 154-1). If de-registration had been performed at time instant 124, the network timer 173 would have been stopped, and the network status for SIM1 would have been changed to de-registered already at time instant 124.

At time instant 125, a third SIM switch takes place in the terminal between the first stack 110-1 and the second stack 110-2. The particulars of this switch are very similar to what has been described above for the switch at time instant 122.

Thus, after time instant 125, SIM1 is active in the second stack (as illustrated by 115-2) and SIM2 is active in the first stack (as illustrated by 115-1). SIM1 is still registered in the network context of the second network (as illustrated by 154-2). The value of the periodic update timer 134 has been transferred from the first to the second stack and a corresponding periodic update timer is now running in the second stack (as illustrated by 135). The timer 134 associated with SIM1 in the first stack is no longer running.

As for time instant 122, no de-registration (by the first stack) and registration (by the second stack) of SIM1 is performed at time instant 125 according to this embodiment (e.g. since SIM1 is registered in the same network before and after the switch and relevant parameters have not changed).

At time instant 185, the periodic update timer 135 expires and the second stack performs SIM1 update signaling 145-2 towards the second network to keep SIM1 registered. The update procedure comprises resetting of the network timer, which now starts running from its reset value (as illustrated by 174'), and the periodic update timer, which also starts running from its reset value (as illustrated by 135').

It is clear that, in this particular example, resources (e.g. power, time, signaling) are saved at time instants 122 and 125 because neither de-registration nor registration is performed, and at time instants 123 and 124 because de-registration is not performed.

Figure 2:
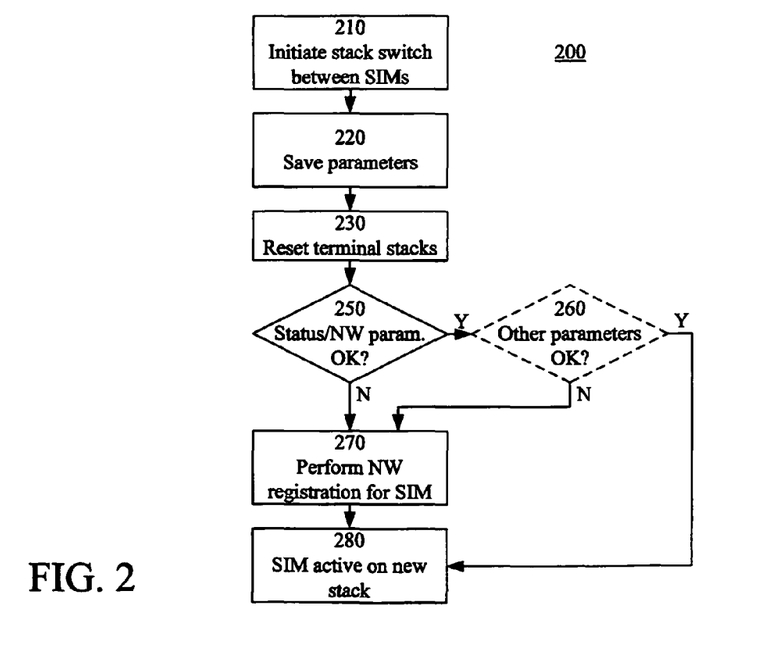
FIG. 2 is a flowchart illustrating example method steps according to some embodiments of the invention.

FIG. 2 illustrates an example method 200 according to some embodiments of the invention.

The method starts in step 210, where a subscriber identity switch between stacks is initiated. As mentioned before, this may (for example) be initiated by a user, by the terminal based on user preferences, or autonomously by the terminal. The subscriber identity switch may, for example, be initiated when a subscriber identity switch request is received via a user interface of the device, or when a need for a subscriber identity switch is detected (e.g. due to heavy data traffic for one of the SIMs).

Step 220 may be performed only for one/some of the SIMs or typically for both/all SIMs involved in the switch.

If performed for only one/some of the SIMs involved in the switch, there can typically not be a comparison to non-stored parameters of other SIMs. In such cases other comparisons may be used as exemplified below in relation to steps 250 and 260.

In some embodiments, storing of some parameters in step 220 may be avoided based on knowledge that that particular parameters will not be of use for the other stack (e.g. due to different stack configurations).

In step 220, one or more parameters relating to a current stack state (e.g. location information and/or network parameters and/or parameters relating to the periodic update timer and/or other parameters as have been exemplified above) are temporarily saved.

The storing may be in a dedicated or temporarily allocated memory or memory area internal or external to a terminal arrangement as will be described later in relation to FIG. 3. The storing may also be in any other suitable means, e.g. in the related SIM card itself.

The storing is done before the stack switch and may provide a context for the current stack status.

As elaborated on above, various combinations of parameters may be stored in different embodiments of the invention. In some embodiments a single parameter may be stored, and in some embodiments two or more parameters may be stored. The parameters may, for example, comprise one or more of:
Parameters related to the SIM status in the network or related to the network itself, e.g.:
update status
registered/de-registered
network code, network identity (e.g. operator identity)
location information, e.g.:
location/routing area (network code (MCC, MNC), location area code (location area identity))
routing area code
identity fields (e.g. TMSI/P-TSMI)
radio access technology (e.g. GSM/GPRS/EDGE, WCDMA, OFDM).
Parameters related to mobility, e.g.:
serving cell information (e.g. cell identity)
neighboring cells information.
Parameters related to the implementation of the terminal itself, e.g.:
respective capabilities of the stacks
respective IMEI of the stacks.

The stored parameters may, for example, be a current temporary location, such as current local temporary identity, or information of a previous (e.g. last/latest) location update towards the network. The location information may, additionally or alternatively, comprise one or more of current/last/latest serving cell information (comprising e.g. frequency band, radio access technology, etc.), mobile terminal identity value(s) (e.g. TMSI, P-TMSI, etc.), and ciphering parameters, etc.

The telecommunication stacks of the terminal that are involved in the switch are then initiated to a state that corresponds to the respective SIM after the SIM switch as illustrated in step 230. Such initiation may involve loading one or more of the parameters stored in step 220. For example, the value of the periodic update timer may typically be moved from one stack to another during the switch. The loading or not of some parameters may possibly be subject to the outcome of the evaluation in steps 250 and/or 260 as will be described in the following.

It is noted that the stacks may typically be initiated without performing of any de-registration signaling procedures towards the network. Thus, de-activation of SIMs is an entirely local procedure in these embodiments. In other embodiments, de-registration may sometimes be performed.

In alternative embodiments, step 230 may be performed at a later point in time, e.g. after steps 250, 260, or even in parallel with steps 250, 260.

It is noted that steps 250 and 260 may be performed in parallel or in sequence in any appropriate order.

It is also noted that steps 250, 260, 270 and 280 are typically performed for each SIM involved in the SIM switch. However, there may be embodiments, where steps 250 and 260 are only performed for one/some SIMs (for the other SIMs, the method proceeds directly from step 230 to 270 without any evaluation, steps 250 and 260).

In step 250 it is checked whether or not one or more status and/or network parameters (e.g. the registered/de-registered status, the location information, and/or the network identity) relating to the relevant SIM when it was active in the previous stack are the same as the corresponding parameters relating to the SIM when it is active in the new stack. In some embodiments, the parameters do not have to have the exact same value, but rather have values that correspond to a same or sufficiently similar condition.

This may, for example, be determined by comparing stored parameters of the relevant SIM before the switch to stored parameters of the other SIM before the switch. If they are equal, it may be concluded that the prospect parameters after the switch will probably be the same.

In some embodiments, the determination in step 250 may comprise comparing stored parameters of the relevant SIM before the switch to the corresponding parameters of the same SIM after the switch. If they are equal, it may be concluded that no update/registering process is needed.

If the compared parameters are not the same (no path out of step 250), the relevant stack of the terminal performs a network registration (or update if applicable) signaling procedure towards the relevant network for the SIM in step 270 and the process continues to step 280.

If the compared parameters are the same (yes path out of step 250), the process continues to optional step 260, where it is determined whether or not other relevant parameters (e.g. mobility parameters and/or terminal specific parameters) indicate that conditions will be the same (or if applicable sufficiently similar) for the SIM before and after the switch. This may, for example, be determined by comparisons similar to those described in connection to step 250 (but for other parameters).

If the other relevant parameters are not the same (no path out of step 260), the relevant stack of the terminal performs a network registration (or update if applicable) signaling procedure towards the relevant network for the SIM in step 270 and the process continues to step 280.

If the conditions are prospectively the same (yes path out of step 260), the process continues directly to step 280 and no network registration signaling procedure towards the network for the SIM is performed.

If the compared parameters are the same in step 250 (yes path out of step 250), and if optional step 260 is ignored, the process continues directly from step 250 to step 280 and no network registration signaling procedure towards the network for the SIM is performed.

In some embodiments, step 280 may involve loading one or more of the parameters stored in step 220 into the new stack. For instance, the parameters, the loading of which are subject to the outcome of the evaluation in steps 250 and/or 260, may be loaded. For example, if the status and network parameters were found to be equal in step 250 and a IMEI update was found necessary in step 260, the process would continue to step 270 where an IMEI update towards the network might be performed, and then to step 280, where the network and status parameters (but not the IMEI) stored in step 220 may be loaded into the new stack.

In some embodiments, the loading of some parameters is always done as a part of step 230. In some embodiments, the loading of some parameters is always done as a part of step 280. In some embodiments, the loading of some parameters is done as a part of step 280 subject to the evaluation of step 250 and/or step 260. In some embodiments, the loading of some parameters is done as a part of step 280 only if step 270 is visited.

In step 280, the switch has been performed and the respective SIMs are active in their respective new stacks.

Figure 3:
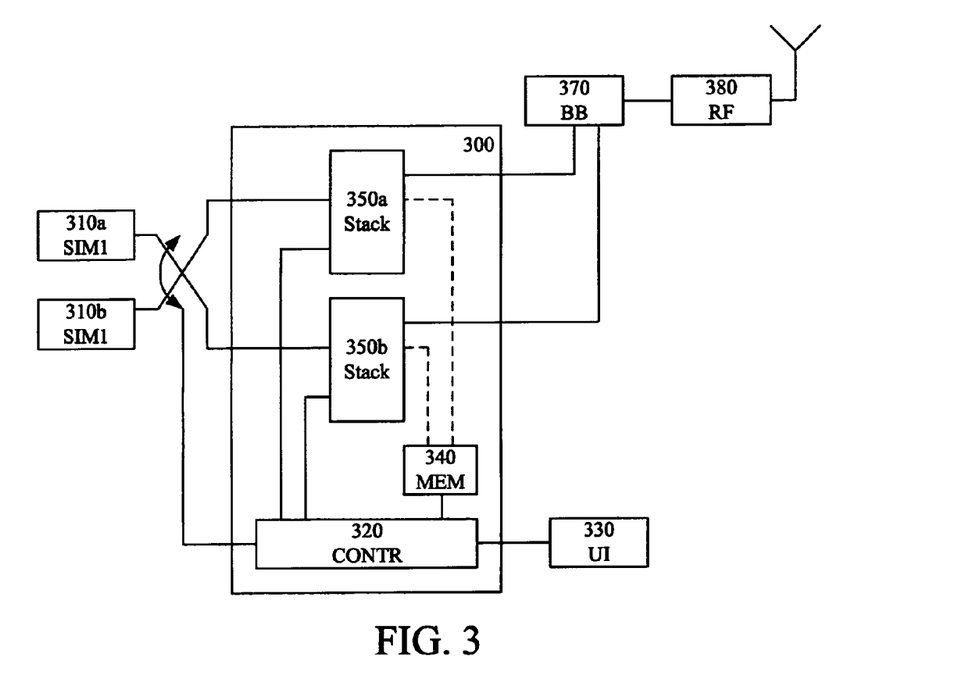
FIG. 3 is a block diagram illustrating an example arrangement according to some embodiments of the invention.

FIG. 3 is a schematic drawing illustrating an example arrangement 300 according to some embodiments of the invention.

The arrangement comprises a controller 320, two telecom stacks 350*a* and 350*b* and one or more memory units 340. The controller 320 is connected to the stacks 350*a*, 350*b* and the memory 340 and to a user interface 330. The stacks 350*a*, 350*b* are connected to the memory 340 either directly or via the controller 320.

The arrangement 300 and the user interface 330 may be comprised in a mobile terminal device which also comprises two or more subscriber identity means (e.g. SIM card slots) for associating one or more subscriber identities 310*a*, 310*b* with the mobile terminal device. In the example of FIG. 3, there are two subscriber identities 310*a*, 310*b* associated with the device and they are each connected to, or otherwise associated with, a respective stack 350*a*, 350*b* via a switch which is controlled by the controller 320.

The mobile terminal device may also comprise other units (which may be associated with the stacks 350*a*, 350*b* and the subscriber identities 310*a*, 310*b*), such as one or more baseband units 370 and one or more radio frequency unit 380 for communicating with one or more telecommunication networks. For example, for a DSDS phone, there are typically a single baseband unit and a single radio frequency unit while for a DSDC phone, there are typically two single baseband units and two single radio frequency units.

The arrangement 300 is adapted to control a switching of subscriber identity between stacks of the device. For example, the arrangement 300 may be adapted to perform method steps as described in connection with FIG. 2.

Typically, the device comprising the arrangement 300 is capable at each moment in time of having one or more active subscriber identities 310*a*, 310*b*. The telecommunication stacks 350*a*, 350*b* are adapted to support a currently active subscriber identity each. The memory unit 340 is adapted to store, for each subscriber identity, the parameters as described in step 220 of FIG. 2. The extraction, comparison and storing of the parameters is controlled by the controller 320 when a SIM switch is initiated as in step 210 of FIG. 2 (for example via the user interface 330 or autonomously by the device).

The controller 320 causes switching of SIMs between stacks and re-setting of the stacks 350a, 350b to the respective new SIM (e.g. as described in step 230 of FIG. 2), and checks whether or not network registration/update is needed (e.g. as described in steps 250-260 of FIG. 2). If registration is needed this is performed as in step 270 of FIG. 2 via the baseband unit 370 and radio frequency unit 380.

Figure 4:
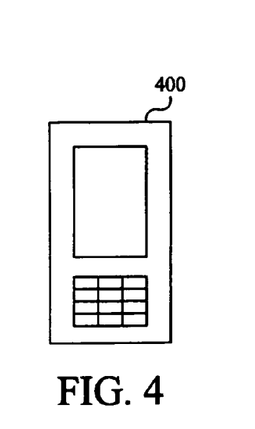
FIG. 4 is a schematic drawing illustrating a mobile terminal comprising an arrangement according to some embodiments of the invention.

FIG. 4 illustrates an example mobile terminal 400. The mobile terminal may be connected, through a radio link, to a network. The mobile terminal may comprise an arrangement for control of switching of subscriber identities between stacks according to embodiments of the invention, for example the arrangement described in connection to FIG. 3.

The mobile terminal 400 is illustrated as a mobile telephone in a schematic front view. The mobile terminal may further comprise one or more antennas and a man-machine interface for operating the mobile terminal (e.g. a display, a keypad, a loudspeaker, and a microphone).

The example mobile terminal 400 is adapted to connect to one or more mobile telecommunication network via a wireless link. A user of the mobile terminal may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 400 and the network may be compliant with at least one mobile telecommunication standard.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or hand-held mobile radio communication equipment, a mobile radio terminal, a mobile telephone, a pager, a communicator, an electronic organizer, a smartphone, a computer, a notebook, a plug-in card, or an embedded drive.

Figure 5:
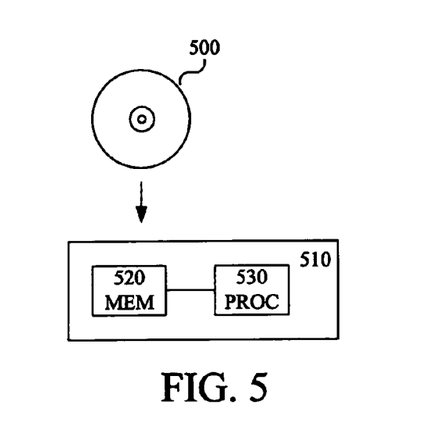
FIG. 5 is a schematic drawing illustrating a computer readable medium according to some embodiments of the invention and an associated data-processing unit.

According to some embodiments of the invention, a computer program product comprises a computer readable medium such as, for example, a diskette, a USB-stick or a CD-ROM. Such a computer readable medium is illustrated by the CD-ROM 500 of FIG. 5. The computer readable medium 500 may have stored thereon a computer program comprising program instructions. The computer program may be loadable into a data-processing unit 510, which may, for example, be comprised in a mobile terminal. When loaded into the data-processing unit 510, the computer program may be stored in a memory 520 associated with or integral to the data-processing unit. According to some embodiments, the computer program may, when loaded into and run by the data-processing unit (for example by processor 530), cause the data-processing unit to execute method steps according to, for example, the method shown in FIG. 2.

It should be noted that embodiments of the invention are equally applicable to dual SIM devices and multiple SIM devices (possibly with multiple stacks) as have been elaborated on above.

Also, even though the subscriber identities typically reside in local memory areas of SIM cards which are physically inserted into corresponding SIM card readers in a mobile terminal; this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g. routers, power consumption meters, home alarms, etc). Such stationary devices are configured to be connected to a cellular communication network and are, when connected, seen as terminals by the network.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of switching subscriber identity between a first and second telecommunication stack of a communication terminal, wherein the communication terminal is a multiple subscriber identity terminal, the method comprising:
    initiating a switch for a first subscriber identity from the first telecommunication stack to the second telecommunication stack and for a second subscriber identity from the second telecommunication stack to the first telecommunication stack;
    determining whether a value of at least one parameter from a first group of parameters associated with the first subscriber identity in the first telecommunication stack corresponds to a value of a corresponding at least one parameter from the first group of parameters associated with the first subscriber identity in the second telecommunication stack; and
    performing network registration of the first subscriber identity only if the value of the at least one parameter from the first group of parameters associated with the first subscriber identity in the first telecommunication stack does not correspond to the value of the corresponding at least one parameter from the first group of parameters associated with the first subscriber identity in the second telecommunication stack.

2. The method of claim 1, wherein the at least one parameter from the first group of parameters includes one or more of:
an update status in the network;
a registered/de-registered status in the network;
a network code;
a network identity;
an operator identity;
location information;
a location area parameter,
a routing area parameter;
a network code;
a location area code;
a routing area code;
an identity field; and
a radio access technology indication.

3. The method of claim 1, further comprising:
temporarily storing the value of at the least one parameter from the first group of parameters associated with the first subscriber identity in the first telecommunication stack before the determination step.

4. The method of claim 1, further comprising:
determining whether a value of at least one parameter from a second group of parameters associated with the first subscriber identity in the first telecommunication stack corresponds to a value of a corresponding at least one parameter from the second group of parameters associated with the first subscriber identity in the second telecommunication stack; and
performing network registration of the first subscriber identity only if the value of the at least one parameter from the second group of parameters associated with the first subscriber identity in the first telecommunication stack does not correspond to the value of the corresponding value of the corresponding parameter from the second group of parameters associated with the first subscriber identity in the second telecommunication stack.

5. The method of claim 4, wherein the at least one parameter from the second group of parameters includes one or more of:
a mobility parameter,
serving cell information;
cell identity;
neighboring cells information;
a stack capability; and
a stack IMEI—international mobile equipment identity.

6. The method of claim 4, further comprising:
temporarily storing the value of the at least one parameter from the second group of parameters associated with the first subscriber identity in the first telecommunication stack before the determination step.

7. The method of claim 1, further comprising:
resetting the second telecommunication stack to a state associated with the first subscriber identity without performing network de-registration of the first subscriber identity.

8. The method of claim 1, and wherein to initiate the switch for the first subscriber identity comprises at least one of:
receiving a switch request for the first subscriber identity via a user interface of the communication terminal;
detecting a match of current conditions with an entry of conditions in a user preference list, and determining a need for switch based on the match detection; and
detecting a current quality of service for the first subscriber identity being below a threshold, wherein the threshold is based on a required quality of service of an application currently associated with the first subscriber identity.

9. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

10. A controller for a communication terminal, wherein the communication terminal is a multiple subscriber identity terminal, wherein the communication terminal comprises at least first and second telecommunication stacks adapted to support a respective subscriber identity, the controller adapted to:
initiate a switch for a first subscriber identity from the first telecommunication stack to the second telecommunication stack and for a second subscriber identity from the second telecommunication stack to the first telecommunication stack;
determine whether a value of at least one network related parameter associated with the first subscriber identity in the first telecommunication stack corresponds to a value of a corresponding at least one network related parameter associated with the first subscriber identity in the second telecommunication stack; and
cause the communication terminal to perform network registration of the first subscriber identity only if the value of the at least one network related parameter associated with the first subscriber identity in the first telecommunication stack does not correspond to the value of the corresponding at least one network related parameter associated with the first subscriber identity in the second telecommunication stack.

11. The controller of claim 10, further adapted to:
detect a current quality of service for the first subscriber identity being below a threshold, wherein the threshold is based on a required quality of service of an application currently associated with the first subscriber identity; and
initiate the switch if the current quality of service for the first subscriber identity is below the threshold.

12. The controller of claim 10, further adapted to:
detect a match of current conditions with an entry of conditions in a user preference list; and
initiate the switch if there is a match of conditions.

13. An arrangement adapted to switch subscriber identity between a first and second telecommunication stack of a communication terminal, the arrangement comprising:
a memory adapted to temporarily store a value of the at least one non-network related parameter associated with the first subscriber identity in the first telecommunication stack;
at least the first and second telecommunication stacks adapted to support a respective subscriber identity; and
the controller of claim 10.

14. A controller for the communication terminal comprising the arrangement according to claim 13.

15. The multiple subscriber identity communication terminal according to claim 10, further comprising a user interface for inputting a subscriber identity switch request.

16. The controller for the communication terminal according to claim 10 configured to temporarily store the value of at the least one parameter associated with the first subscriber identity in the first telecommunication stack before the determination step.

17. The controller for the communication terminal according to claim 10 configured to initiate the switch for the first subscriber identity when at least one of the following steps occurs:
   receiving a switch request for the first subscriber identity via a user interface of the communication terminal;
   detecting a match of current conditions with an entry of conditions in a user preference list, and determining a need for switch based on the match detection; and
   detecting a current quality of service for the first subscriber identity being below a threshold, wherein the threshold is based on a required quality of service of an application currently associated with the first subscriber identity.

* * * * *